United States Patent
Terada et al.

(10) Patent No.: US 10,759,435 B2
(45) Date of Patent: Sep. 1, 2020

(54) CONTROL DEVICE

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Munenori Terada, Okazaki (JP); Takemichi Isono, Okazaki (JP); Makoto Sawada, Nissin (JP); Naoto Tanaka, Nagoya (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 92 days.

(21) Appl. No.: 16/080,110

(22) PCT Filed: Feb. 24, 2017

(86) PCT No.: PCT/JP2017/007191
§ 371 (c)(1),
(2) Date: Aug. 27, 2018

(87) PCT Pub. No.: WO2017/169396
PCT Pub. Date: Oct. 5, 2017

(65) Prior Publication Data
US 2019/0061767 A1    Feb. 28, 2019

(30) Foreign Application Priority Data
Mar. 28, 2016 (JP) ................................ 2016-064421

(51) Int. Cl.
*B60W 30/19* (2012.01)
*F16H 37/02* (2006.01)
(Continued)

(52) U.S. Cl.
CPC .......... *B60W 30/19* (2013.01); *B60W 10/026* (2013.01); *B60W 10/06* (2013.01);
(Continued)

(58) Field of Classification Search
CPC ........... Y10T 477/635; Y10T 477/6352; Y10T 477/6197; Y10T 477/6203; F16H 61/143;
(Continued)

(56) References Cited

U.S. PATENT DOCUMENTS

| | | | |
|---|---|---|---|
| 5,021,031 A | 6/1991 | Hibi | |
| 6,036,619 A | 3/2000 | Tashiro et al. | |

(Continued)

FOREIGN PATENT DOCUMENTS

| | | | |
|---|---|---|---|
| JP | H03-61762 A | 3/1991 | |
| JP | H10-122355 A | 5/1998 | |

(Continued)

OTHER PUBLICATIONS

May 16, 2017 International Search Report issued in International Patent Application No. PCT/JP2017/007191.

*Primary Examiner* — Roger L Pang
(74) *Attorney, Agent, or Firm* — Oliff PLC

(57) ABSTRACT

A control device that controls a vehicle transmission device including an input drivingly coupled to an internal combustion engine, an output drivingly coupled to wheels, a shift input drivingly coupled to the input via a fluid coupling having a lock-up clutch, and a speed change mechanism disposed on a power transmission path connecting the shift input and the output, wherein the speed change mechanism is capable of performing both continuously variable shifting that continuously changes a speed ratio, and stepped shifting that changes a speed ratio in a stepwise manner, the control device including: an electronic control unit that is configured to perform, when the stepped shifting is performed, rotation (Continued)

maintained engagement control that controls an engagement pressure of the lock-up clutch such that a rotational speed of the input follows a predetermined target rotational speed, regardless of a change in rotational speed of the shift input.

17 Claims, 4 Drawing Sheets

(51) Int. Cl.
*B60W 10/02* (2006.01)
*B60W 10/06* (2006.01)
*B60W 10/107* (2012.01)
*B60W 10/11* (2012.01)
*F16H 37/08* (2006.01)
*F16H 61/14* (2006.01)
*F16H 59/42* (2006.01)
*F16H 59/70* (2006.01)
*F16H 59/36* (2006.01)

(52) U.S. Cl.
CPC .......... *B60W 10/107* (2013.01); *B60W 10/11* (2013.01); *F16H 37/022* (2013.01); *F16H 37/0846* (2013.01); *F16H 61/143* (2013.01); *B60W 2510/0638* (2013.01); *B60W 2510/1005* (2013.01); *B60W 2510/1015* (2013.01); *B60W 2710/024* (2013.01); *B60W 2710/0644* (2013.01); *B60W 2710/1005* (2013.01); *B60W 2710/1011* (2013.01); *F16H 59/42* (2013.01); *F16H 59/70* (2013.01); *F16H 2037/0873* (2013.01); *F16H 2059/366* (2013.01); *F16H 2061/146* (2013.01); *Y10T 477/6197* (2015.01); *Y10T 477/6203* (2015.01); *Y10T 477/635* (2015.01); *Y10T 477/6352* (2015.01)

(58) Field of Classification Search
CPC .......... F16H 37/0846; F16H 2061/146; F16H 2059/366; F16H 2037/0873; F16H 59/70; F16H 59/42; F16H 37/022; B60W 10/11; B60W 10/107; B60W 10/06; B60W 10/026; B60W 2710/1011; B60W 2710/1005; B60W 2710/0644; B60W 2710/024; B60W 2510/1015; B60W 2510/1005; B60W 2510/0638
See application file for complete search history.

(56) References Cited

U.S. PATENT DOCUMENTS

| | | | |
|---|---|---|---|
| 6,077,188 A * | 6/2000 | Futamura | F16H 61/143 477/65 |
| 2010/0204011 A1* | 8/2010 | Iraha | F16H 61/143 477/175 |
| 2016/0091090 A1* | 3/2016 | Kimura | F16H 61/66259 474/11 |

FOREIGN PATENT DOCUMENTS

| | | |
|---|---|---|
| JP | 2012-047254 A | 3/2012 |
| JP | 2014-214791 A | 11/2014 |

* cited by examiner

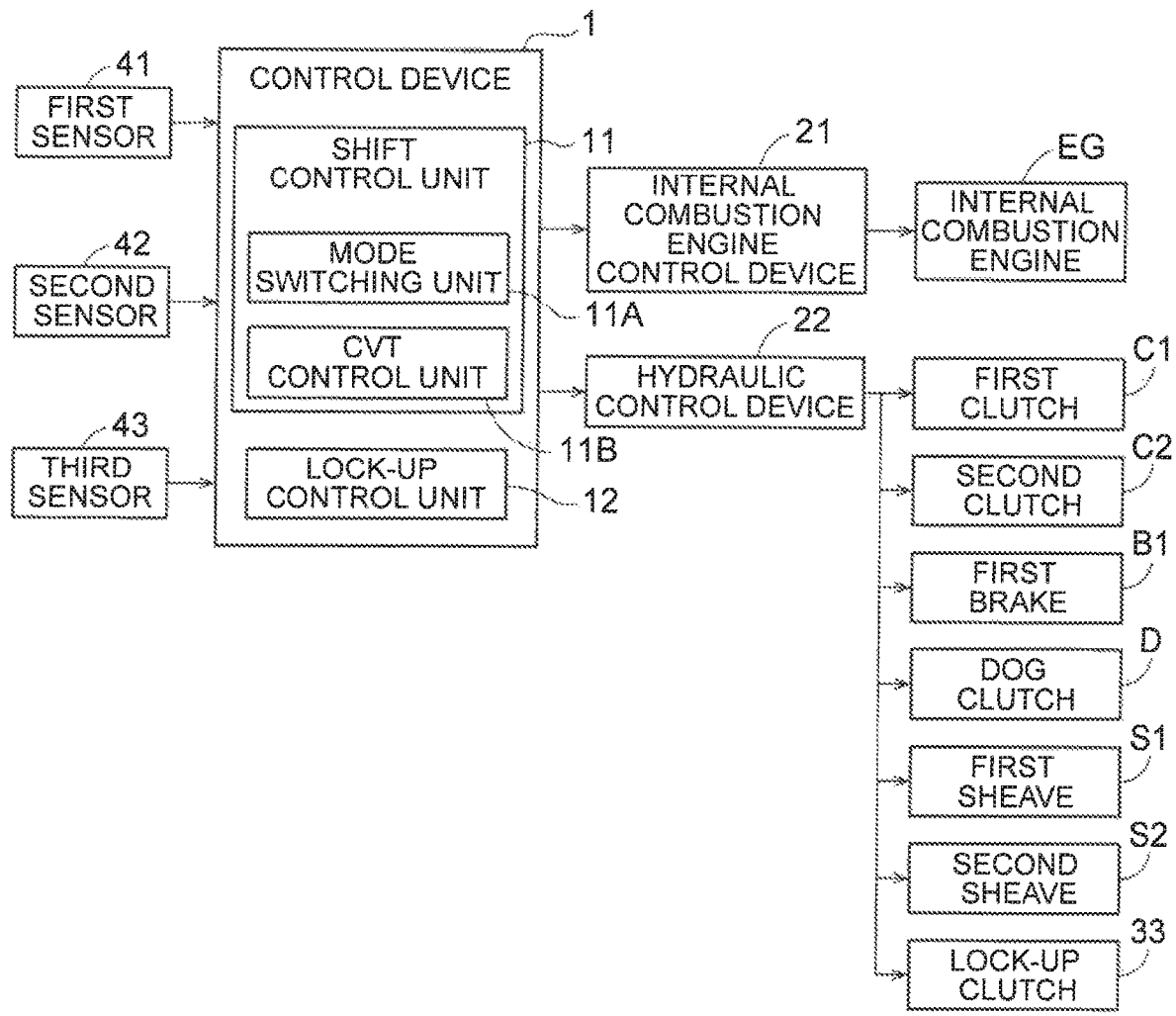

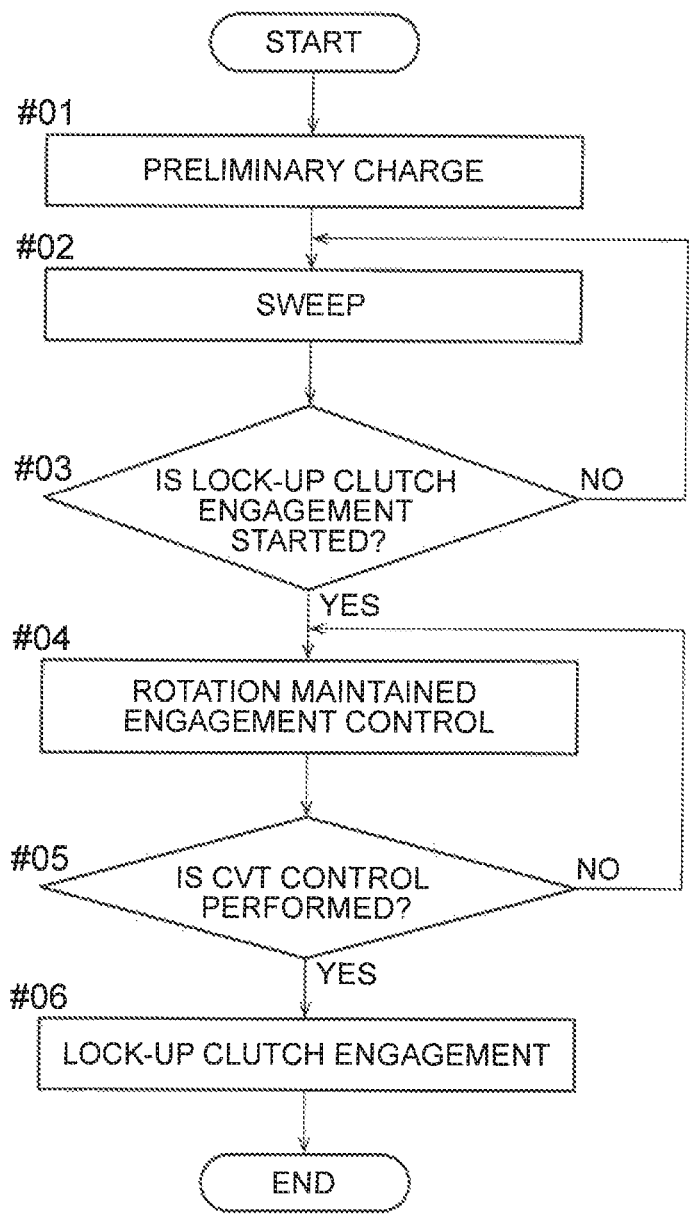

CONTROL DEVICE

BACKGROUND

The present disclosure relates to a control device that controls a vehicle transmission device.

There has been used a vehicle transmission device including a fluid coupling having a lock-up clutch. For example, Japanese Patent Application Publication No. 201247254 (JP 201247254) discloses a vehicle transmission device including a fluid coupling having a lock-up clutch, and a speed change mechanism, on a power transmission path connecting an internal combustion engine and wheels. JP 2012-47254 A discloses, with regard to control of the vehicle transmission device, that slip start control is performed to slip-engage the lock-up clutch when the vehicle is started.

However, JP 201247254 A does not include a specific description about how to control the engagement pressure of the lock-up clutch in the slip start control. Specifically, the speed change mechanism disclosed in JP 201247254 A is capable of performing only continuously variable shifting that continuously changes the speed ratio, and JP 201247254 A does not include any specific description or implication about control of the engagement pressure of the lock-up clutch in the case where the speed change mechanism is capable of performing not only continuously variable shifting but also stepped shifting that changes the speed ratio in a stepwise manner.

SUMMARY

It is desired to improve the drivability during stepped shifting in a vehicle transmission device that includes a fluid coupling having a lock-up clutch and a speed change mechanism on a power transmission path connecting an internal combustion engine and wheels, and that is capable of performing not only continuously variable shifting but also stepped shifting.

A control device according to the present disclosure controls a vehicle transmission device including an input drivingly coupled to an internal combustion engine, an output drivingly coupled to wheels, a shift input drivingly coupled to the input via a fluid coupling having a lock-up clutch, and a speed change mechanism disposed on a power transmission path connecting the shift input and the output, wherein the speed change mechanism is capable of performing both continuously variable shifting that continuously changes a speed ratio, and stepped shifting that changes a speed ratio in a stepwise manner, the control device including: an electronic control unit that is configured to perform, when the stepped shifting is performed, rotation maintained engagement control that controls an engagement pressure of the lock-up clutch such that a rotational speed of the input follows a predetermined target rotational speed, regardless of a change in rotational speed of the shift input.

According to the configuration of the speed change mechanism of the vehicle transmission device capable of performing both continuously variable shifting and stepped shifting, the rotational speed of the shift input changes in a stepwise manner in response to a stepwise change in speed ratio, during stepped shifting. In this case, if the rotational speed of the input and the internal combustion engine changes greatly in response to the stepwise change in rotational speed of the shift input, this may result in giving a sense of discomfort to the occupant of the vehicle. In particular, in the vehicle transmission device including the continuously variable speed change mechanism, variation in the rotational speed of the input and the internal combustion engine is generally small. Therefore, if such a phenomenon occurs during stepped shifting, the occupant of the vehicle is likely to have a sense of discomfort due to the difference from the case of continuously variable shifting.

In this regard, according to the above configuration, by performing rotation maintained engagement control that controls the engagement pressure of the lock-up clutch when the stepped shifting is performed, it is possible to make the rotational speed of the input follow the predetermined target rotational speed, regardless of a change in rotational speed of the shift input. Even when the rotational speed of the shift input changes greatly in response to a stepwise change in speed ratio, it is possible to reduce the variation width of the rotational speed of the input and the internal combustion engine, by making the rotational speed of the input and the internal combustion engine follow the target rotational speed that has small temporal changes, for example. Therefore, the drivability during stepped shifting can be improved. Further, the rotational speed of the input and the internal combustion engine can be prevented from excessively increasing, so that the fuel consumption rate can be improved.

Further features and advantages of the technique of the present disclosure will become more readily apparent from the following description of illustrative, non-limiting embodiments with reference to the accompanying drawings.

BRIEF DESCRIPTION OF THE DRAWINGS

FIG. 2 is a block diagram illustrating a control device.

FIG. 3 is an engagement table of the vehicle transmission device.

FIG. 5 is a flowchart illustrating an example of the procedure of rotation maintained engagement control.

DETAILED DESCRIPTION OF EMBODIMENTS

An embodiment of a control device will be described with reference to the drawings. A control device 1 according to the present embodiment is a control device for a vehicle transmission device, and controls a vehicle transmission device 3 (hereinafter, simply referred to as a "transmission device 3"). The transmission device 3 of the present embodiment is basically configured as a continuously variable transmission device including a speed change mechanism 35 capable of performing continuously variable shifting that continuously changes the speed ratio.

Figure 1:
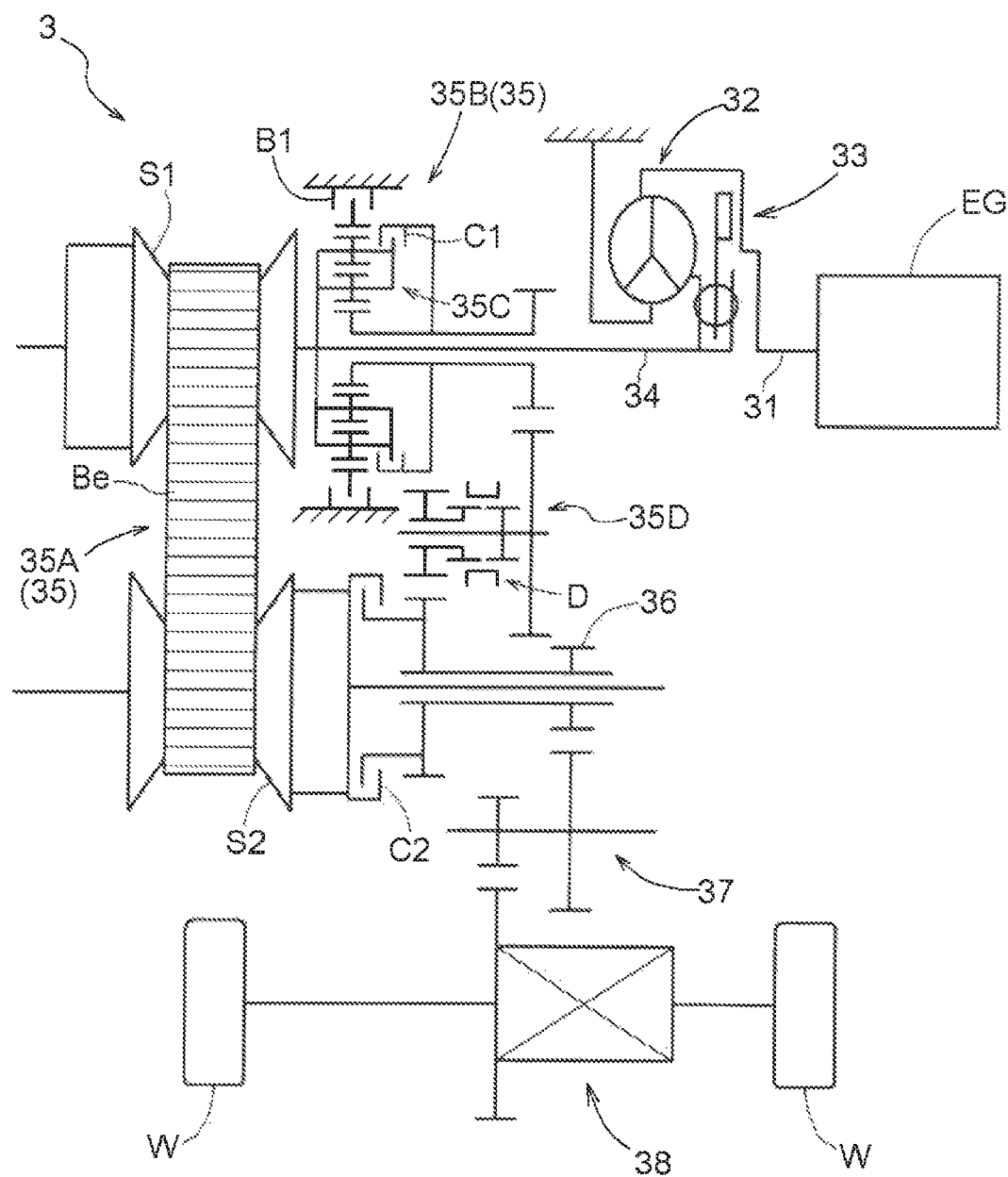
FIG. 1 is a schematic diagram illustrating a vehicle transmission device according to an embodiment.

As illustrated in FIG. 1, the transmission device 3 includes an input member 31, a fluid coupling 32 having a lock-up clutch 33, a shift input member 34, the speed change mechanism 35, and an output member 36. The speed change mechanism 35 of the present embodiment includes a continuously variable speed change mechanism 35A and a forward/reverse drive switching mechanism 35B. The transmission device 3 includes a counter gear mechanism 37 and an output differential gear mechanism 38. These components are accommodated in a case (drive device case) (not illustrated).

The input member 31 is coupled to an internal combustion engine EG to allow transmission of a driving force (hereinafter, simply referred to as "drivingly coupled"). The fluid coupling 32 is drivingly coupled to the input member 31 and the shift input member 34. The fluid coupling 32 of the present embodiment is a torque converter including a pump impeller drivingly coupled to the input member 31, a turbine runner drivingly coupled to the shift input member 34, and a stator disposed therebetween, for example. The fluid coupling 32 may be a fluid coupling including only a pump impeller and a turbine runner. When the lock-up clutch 33 is in the disengaged state, the fluid coupling 32 transfers torque of the internal combustion engine EG that is input to the input member 31, to the shift input member 34 through fluid transmission via hydraulic oil therein. On the other hand, when the lock-up clutch 33 is in the engaged state, torque of the internal combustion engine EG that is input to the input member 31 is directly transferred to the shift input member 34. In this manner, the shift input member 34 is drivingly coupled to the input member 31 via the fluid coupling 32 having the lock-up clutch 33.

In the following description of the present embodiment, the term "drivingly coupled" refers to a state in which two rotary elements are coupled to allow transmission of a driving force (that is, torque). This state includes a state in which the two rotary elements are coupled to rotate together, and a state in which the two rotary elements are coupled via one or more transmission members to allow transmission of a driving force. Examples of such transmission members include various types of members that transmit rotation at the same speed or a changed speed (such as a shaft, a gear mechanism, and a belt), and may include engagement devices that selectively transmit rotation and a driving force (such as a friction engagement device and a meshing-type engagement device).

The speed change mechanism 35 is disposed on the power transmission path connecting the shift input member 34 and the output member 36. The speed change mechanism 35 changes the rotational speed of the shift input member 34 serving as an input-side rotary member of the speed change mechanism 35 with a predetermined speed ratio, and transmits the resulting rotation to the output member 36 serving as an output-side rotary member. The "speed ratio" refers to a ratio of the rotational speed of the shift input member 34 to the rotational speed of the output member 36. The speed change mechanism 35 of the present embodiment includes the continuously variable speed change mechanism 35A and the forward/reverse drive switching mechanism 35B that are arranged in parallel to each other on the power transmission path connecting the shift input member 34 and the output member 36.

The continuously variable speed change mechanism 35A of the present embodiment is configured as a belt-type continuously variable speed change mechanism. The continuously variable speed change mechanism 35A includes a first sheave S1, a second sheave S2, and a belt Be. The first sheave S1 is drivingly connected to the input member 31. The second sheave S2 is drivingly coupled to the output member 36 via a second clutch C2. The belt Be extends around the first sheave S1 and the second sheave S2. Each of the first sheave S1 and the second sheave S2 includes a movable sheave and a fixed sheave. The movable sheave of each of the first sheave S1 and the second sheave S2 includes a hydraulic servo. When a hydraulic pressure is supplied from a hydraulic control device 22 to these elements, each of the movable sheaves moves in the axial direction, so that each of the groove width of a V-shaped groove of the first sheave S1 and the groove width of a V-shaped groove of the second sheave S2 changes. In this manner, the continuously variable speed change mechanism 35A continuously changes the effective diameter of each of the first sheave S1 and the second sheave S2, thereby transmits the rotation of the shift input member 34 toward the output member 36 while continuously changing the speed ratio.

The maximum speed ratio of the continuously variable speed change mechanism 35A is determined in proportion to the ratio of the maximum effective diameter of the first sheave S1 to the minimum effective diameter of the second sheave S2 that is obtained when the movable sheave of each of the first sheave S1 and the second sheave S2 is moved in its movable range. The minimum speed ratio of the continuously variable speed change mechanism 35A is determined in proportion to the ratio of the minimum effective diameter of the first sheave S1 to the maximum effective diameter of the second sheave S2.

The forward/reverse drive switching mechanism 35B of the present embodiment is configured as a gear-type forward/reverse drive switching mechanism. The forward/reverse drive switching mechanism 35B of the present embodiment includes a differential gear mechanism 35C, a first clutch C1, a first brake B1, a reduction gear mechanism 35D, and a dog clutch D. The differential gear mechanism 35C is a double-pinion type planetary gear mechanism having a sun gear, a carrier, and a ring gear. The input member 31 is drivingly coupled to the carrier, and the ring gear can be selectively fixed by the first brake B1. The sun gear servers as an output rotary element of the differential gear mechanism 35C, and is selectively drivingly coupled to the carrier and the input member 31 by the first clutch C1. The differential gear mechanism 35C (sun gear as an output element) is connected to the output member 36, via the reduction gear mechanism 35D having the dog clutch D.

When the first clutch C1 is in the engaged state, the forward/reverse drive switching mechanism 35B directly transmits the rotation of the input member 31 to the output member 36 so as to rotate wheels W in the forward direction (forward drive state). On the other hand, when the first brake B1 is in the engaged state, the forward/reverse drive switching mechanism 35B reverses the rotation of the input member 31 and transmits the reversed rotation to the output member 36 so as to rotate the wheels W in the reverse direction (reverse drive state). In this manner, the forward/reverse drive switching mechanism 35B is capable of switching between the forward drive state and the reverse drive state. The forward/reverse drive switching mechanism 35B can change the speed of rotation of the shift input member 34 with a predetermined fixed speed ratio and transmit the resulting rotation toward the output member 36, in each of the forward drive state and the reverse drive state. In the present embodiment, the forward/reverse drive switching mechanism 35B corresponds to a "fixed-ratio speed change mechanism".

The speed ratio of the forward/reverse drive switching mechanism 35B in the forward drive state is determined in proportion to the gear ratio of the reduction gear mechanism 35D (the ratio of the number of teeth of a first gear on the differential gear mechanism 35C side to the number of teeth of a second gear on the output member 36 side). The speed ratio of the forward/reverse drive switching mechanism 35B in the forward drive state is determined in proportion to the gear ratio of the differential gear mechanism 35C (the ratio of the number of teeth of the ring gear to the number of teeth of the sun gear) and the gear ratio of the reduction gear mechanism 35D.

The speed ratio of the forward/reverse drive switching mechanism 35B in the forward drive state is set to a value greater than the maximum speed ratio of the continuously variable speed change mechanism 35A. Therefore, when the speed change mechanism 35 including the continuously variable speed change mechanism 35A and the forward/reverse drive switching mechanism 35B is viewed as a whole, the speed change mechanism 35 is capable of performing both continuously variable shifting that continuously changes the speed ratio, and stepped shifting that changes the speed ratio in a stepwise manner. The speed change mechanism 35 can perform continuously variable shifting in a state in which the rotation of the shift input member 34 is transmitted to the output member 36 via the continuously variable speed change mechanism 35A, and can perform stepped shifting when switching from a state in which the rotation of the shift input member 34 is transmitted to the output member 36 via the forward/reverse drive switching mechanism 35B to a state in which the rotation is transmitted to the output member 36 via the continuously variable speed change mechanism 35A.

The output member 36 is drivingly coupled to the two right and left wheels W via the counter gear mechanism 37 and the output differential gear mechanism 38.

The control device 1 serves as a main unit for controlling the operation of the transmission device 3. As illustrated in FIG. 2, the control device 1 includes a shift control unit 11, and a lock-up control unit 12. The shift control unit 11 includes a mode switching unit 11A and a CVT control unit 11B. These functional units are implemented by software (program) stored in a storage unit such as a memory, hardware such as a separately provided arithmetic circuit, or a combination of both. The functional units are capable of exchanging information with each other. Further, the control device 1 is capable of obtaining information on the detection results of various sensors (a first sensor 41 to a third sensor 43) provided at different locations on the vehicle having the transmission device 3 mounted thereon.

The first sensor 41 detects a rotational speed of the input member 31 and a member (for example, the internal combustion engine EG) that rotates with the input member 31. The second sensor 42 detects the rotational speed of the shift input member 34 and a member that rotates with the shift input member 34. The third sensor 43 detects the rotational speed of the output member 36, or the rotational speed of a member (for example, the wheels W) that rotates synchronously with the output member 36. The control device 1 can calculate a vehicle speed based on the detection result of the third sensor 43. The control device 1 may be capable of obtaining information other than that described above, such as, for example, the accelerator operation amount, the brake operation amount, and the temperature of hydraulic oil.

The shift control unit 11 performs control to integrate, over the entire vehicle, various shift control operations performed on the speed change mechanism 35 (the first clutch C1, the second clutch C2, the first brake B1, the dog clutch D, the first sheave S1, and the second sheave S2). The shift control unit 11 determines an operation mode to be established by the speed change mechanism 35 based on, for example, sensor detection information (mainly, information on the accelerator operation amount and the vehicle speed). For example, the relationship of the accelerator operation amount and the vehicle speed with the corresponding operation mode is stored in a map format or the like in the control device 1, and the shift control unit 11 may determine an operation mode based on the map, as well as the accelerator operation amount and the vehicle speed at the time.

Further, the shift control unit 11 calculates vehicle required torque, which is torque required to drive the vehicle, based on the sensor detection information. Furthermore, the shift control unit 11 determines output torque (internal combustion engine required torque), which is torque that the internal combustion engine is required to output, based on the determined operation mode and the sensor detection information. In the present embodiment, the control device 1 (shift control unit 11) is capable of controlling the operating point (output torque and rotational speed) of the internal combustion engine EG, via an internal combustion engine control device 21.

The mode switching unit 11A controls the state of each of the first clutch C1, the second clutch C2, the first brake B1, and the dog clutch D to establish the operation mode determined by the shift control unit 11. The mode switching unit 11A controls the hydraulic pressure to be supplied to the hydraulic servo of each of the first clutch C1, the second clutch C2, the first brake B1, and the dog clutch D, thereby controlling the state of engagement of these elements individually. A supply hydraulic pressure to each of the clutches C1, C2, and D and the brake B1 is controlled by the hydraulic control device 22 that operates in accordance with a hydraulic pressure command from the mode switching unit 11A.

As illustrated in FIG. 3, the transmission device 3 of the present embodiment can establish a first forward drive mode, a second forward drive mode, and a reverse drive mode. The first forward drive mode is established when the first clutch C1 and the dog clutch D are in the engaged state (and the other engagement devices are in the disengaged state; the same applies hereafter). The first forward drive mode is a drive mode in which the rotation of the input member 31 is transmitted to the output member 36 and the wheels W, via the forward/reverse drive switching mechanism 35B in the forward drive state. The second forward drive mode is established when the second clutch C2 is in the engaged state. The second forward drive mode is a drive mode in which the rotation of the input member 31 is transmitted to the output member 36 and the wheels W, via the continuously variable speed change mechanism 35A. The reverse drive mode is established when the first brake B1 and the dog clutch D are in the engaged state. The reverse drive mode is a drive mode in which the rotation of the input member 31 is transmitted to the output member 36 and the wheels W, via the forward/reverse drive switching mechanism 35B in the reverse drive state. In the present embodiment, the first forward drive mode corresponds to a "first drive mode", and the second forward drive mode corresponds to a "second drive mode".

As described above, in the present embodiment, the speed ratio of the forward/reverse drive switching mechanism 35B in the forward drive state (the speed ratio in the first forward drive mode) is set to a value greater than the maximum speed ratio of the continuously variable speed change mechanism 35A (the maximum speed ratio in the second forward drive mode). In the present embodiment, the mode switching unit 11A controls a mode change from the first forward drive mode to the second forward drive mode, thereby controlling stepped shifting in the speed change mechanism 35. The mode switching unit 11A causes the speed change mechanism 35 to perform stepped shifting, by switching the first clutch C1 and the dog clutch D from the engaged state to the disengaged state, and switching the second clutch C2 from the disengaged state to the engaged state (or by performing the reverse operation), for example.

The CVT control unit 11B adjusts the speed ratio of the continuously variable speed change mechanism 35A when the operation mode determined by the shift control unit 11 is the second forward drive mode. The CVT control unit 11B supplies a hydraulic pressure to the hydraulic servo of each of the first sheave S1 and the second sheave S2 to move the movable sheave in the axial direction, thereby adjusting the groove width of the V-shaped groove of each of the first sheave S1 and the second sheave S2. Thus, the CVT control unit 11B adjusts the speed ratio of the continuously variable speed change mechanism 35A. The supply hydraulic pressure to the first sheave S1 and the second sheave S2 is controlled by the hydraulic control device 22 that operates in accordance with a hydraulic pressure command from the CVT control unit 11B.

The lock-up control unit 12 controls the state of engagement of the lock-up clutch 33. In the present embodiment, the lock-up clutch 33 is a hydraulically-driven friction engagement device capable of transmitting a driving force by a friction force between two engagement members engaged with each other. Note that each of the first clutch C1, the second clutch C2, and the first brake B1 included in the speed change mechanism 35 is also the same type of friction engagement device. The lock-up control unit 12 controls the state of engagement of the lock-up clutch 33 to bring the lock-up clutch 33 into the engaged state or the disengaged state. The supply hydraulic pressure to the lock-up clutch 33 is controlled by the hydraulic control device 22 that operates in accordance with a hydraulic pressure command from the lock-up control unit 12.

The "engaged state" indicates a state in which a transfer torque capacity is produced in the lock-up clutch 33 formed of a friction engagement device. The transfer torque capacity refers to the maximum torque that can be transferred by friction of the lock-up clutch 33 formed of a friction engagement device. The magnitude of the transfer torque capacity is proportional to the pressure (engagement pressure) that pushes two engagement members (an input-side engagement member and an output-side engagement member) included in the lock-up clutch 33 against each other. The "engaged state" includes a "direct-coupling engaged state" in which there is no difference in rotational speed (slip) between two engagement members, and a "slip engaged state" in which there is a difference in rotational speed. The "disengaged state" indicates a state in which no transfer torque capacity is produced in the lock-up clutch 33 formed of a friction engagement device.

The lock-up control unit 12 performs control to switch the state of engagement of the lock-up clutch 33 (mainly, direct-coupling engaged state/disengaged state) based on, for example, sensor detection information (mainly, information on the accelerator operation amount and the vehicle speed). For example, the relationship of the accelerator operation amount and the vehicle speed with the corresponding state of engagement of the lock-up clutch 33 is stored in a map format or the like in the control device 1, and the shift control unit 11 may perform control to bring the lock-up clutch 33 into the direct-coupling engaged state or the disengaged state, based on the map, as well as the accelerator operation amount and the vehicle speed at the time.

The lock-up control unit 12 is configured to perform rotation maintained engagement control specific to the present embodiment when stepped shifting is performed. In the case where stepped shifting is performed in the speed change mechanism 35 in response to a mode change from the first forward drive mode to the second forward drive mode, the lock-up control unit 12 performs rotation maintained engagement control. In the present embodiment, the speed ratio in the first forward drive mode is set to be greater than the maximum speed ratio in the second forward drive mode. Typically, the first forward drive mode is established when the vehicle is started, and is switched to the second forward drive mode when the vehicle speed increases to a certain extent. Thus, the lock-up control unit 12 performs rotation maintained engagement control, in a situation where the vehicle speed increases after the vehicle is started, for example.

In the rotation maintained engagement control, the lock-up control unit 12 performs control to bring the lock-up clutch 33 into the slip engagement state, and controls the engagement pressure of the lock-up clutch 33 such that the rotational speed of the input member 31 and the internal combustion engine EG follows a predetermined target rotational speed. In the case where stepped shifting is performed in the speed change mechanism 35, the rotational speed (hereinafter, referred to as a "synchronous rotational speed") of the shift input member 34 determined in accordance with the vehicle speed and the speed ratio at the time (see time T04 to T05 in FIG. 4) changes greatly before and after stepped shifting. Even in this case, the lock-up control unit 12 controls the engagement pressure of the lock-up clutch 33 such that the rotational speed of the input member 31 and the internal combustion engine EG follows a predetermined target rotational speed, regardless of a change in rotational speed of the shift input member 34. The target rotational speed is preferably set to a constant rotational speed. The term "constant" means that there is no temporal change, or there is a slight increase or decrease that can be regarded as substantially no temporal change.

Figure 4:
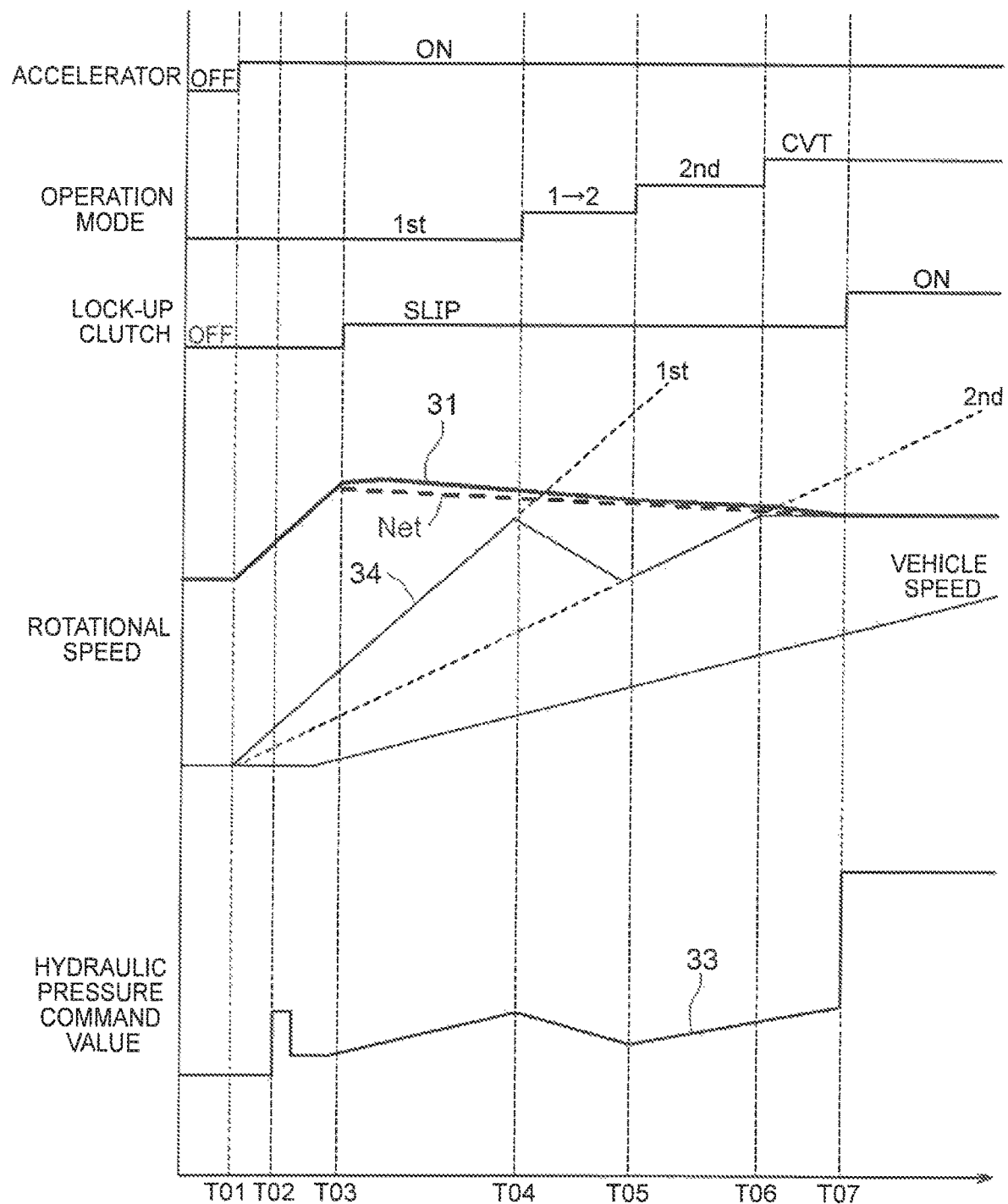
FIG. 4 is a timing chart illustrating an example of rotation maintained engagement control.

The details of the rotation maintained engagement control will be described with reference to the timing chart of FIG. 4 and the flowchart of FIG. 5. The accelerator is depressed, and the vehicle starts (time T01). After a lapse of a predetermined period of time, the hydraulic servo of the lock-up clutch 33 is preliminarily charged with a high hydraulic pressure (time T02, step #01). After that, the supply hydraulic pressure is gradually increased (step #02). While the supply hydraulic pressure to the lock-up clutch 33 is increased, a determination is made as to whether two engagement members of the lock-up clutch 33 have actually started to engage (whether the lock-up clutch 33 has started to have a transfer torque capacity) (step #03).

The determination as to whether engagement of the lock-up clutch 33 is started can be made based on the calculated value of assigned torque of the lock-up clutch 33 at the time, for example. The assigned torque of the lock-up clutch 33 is calculated based on the internal combustion engine torque, the pump torque determined from a capacity coefficient, and the inertia torque of the internal combustion engine EG. The assigned torque of the lock-up clutch 33 is calculated by $$Tc=Te-Tp+Ti$$

wherein Tc, Te, Tp, and Ti represent the assigned torque of the lock-up clutch. 33, the internal combustion engine torque, the pump torque determined from a capacity coefficient, and the inertia torque of the internal combustion engine EG, respectively. The determination as to whether engagement of the lock-up clutch 33 is started can be made based on start of rise in assignment torque Tc of the look-up clutch 33.

In the present embodiment, when engagement of the lock-up clutch 33 is determined to be started (time T03, step #03; Yes), rotation maintained engagement control is performed from this time point (step #04). As described above, in rotation maintained engagement control, the engagement pressure of the lock-up clutch 33 is controlled such that rotational speed of the input member 31 and the internal combustion engine EG follows a predetermined target rotational speed, regardless of a change in rotational speed of the shift input member 34. The target rotational speed of the input member 31 and the internal combustion engine EG can be set based on the predicted value of the synchronous rotational speed in the second forward drive mode that is to be established in the future, for example. That is, the target rotational speed is preferably set such that the target rotational speed changes to have about the same speed and inclination as those of a synchronization prediction line in the second forward drive mode in the future.

Note that the control device 1 stores in advance a map (synchronization prediction line map) defining the relationship of the vehicle speed and the accelerator operation amount with the synchronization prediction line in the second forward drive mode in the future. When the accelerator is depressed, a synchronization prediction line is set based on the vehicle speed and the accelerator operation amount at the time and the synchronization prediction line map. The target rotational speed of the input member 31 and the internal combustion engine EG is set based on the future synchronization prediction line.

The lock-up control unit 12 determines a target engagement pressure of the lock-up clutch 33 for achieving the set target rotational speed of the input member 31 and the internal combustion engine EG and generates and outputs a hydraulic pressure command value corresponding to the target engagement pressure. The target engagement pressure of the lock-up clutch 33 is calculated based on the target transfer torque capacity of the lock-up clutch 33. The target torque capacity of the lock-up clutch 33 is calculated based on the internal combustion engine torque, the target pump torque, and the inertia torque of the internal combustion engine EG. Of these, the target pump torque is calculated based on a target capacity coefficient. More specifically, the target engagement pressure of the lock-up clutch 33 is determined by adjusting the engagement pressure calculated based on a target capacity coefficient, which is calculated from the target rotational speed of the internal combustion engine EG and the rotational speed of the shift input member 34, such that the actual rotational speed follows the target rotational speed of the internal combustion engine EG in the feedforward control, based on the internal combustion engine torque and the inertia torque of the internal combustion engine EG. The target transfer torque capacity of the lock-up clutch 33 is calculated by $$Tct = Te - Tpt + Ti = Te - Ct \cdot Net\,\hat{}\,2 + Ti$$

wherein Tct, Te, Tpt, Ti, Ct, and Net represent the target transfer torque capacity of the lock-up clutch 33, the internal combustion engine torque, the target pump torque, the inertia torque of the internal combustion engine EG the target capacity coefficient, and the target rotational speed of the input member 31 and the internal combustion engine EG, respectively. Based on the calculated value, the target engagement pressure of the lock-up clutch 33 for causing the lock-up clutch 33 to produce a transfer torque capacity equal to the target transfer capacity Tct is calculated. The lock-up control unit 12 of the present embodiment performs feedforward control of the engagement pressure of the lock-up clutch 33 to adjust the engagement pressure of the lock-up clutch 33 to the target engagement pressure.

Further, in the present embodiment, the lock-up control unit 12 is configured to perform feedback control of the engagement pressure of the lock-up clutch 33 such that the actual rotational speed of the input member 31 actually follows the target rotational speed Net. The lock-up control unit 12 performs, based on the deviation of the actual rotational speed of the input member 31 obtained by the first sensor 41 from the target rotational speed Net and a predetermined gain, feedback control of the engagement pressure of the lock-up clutch 33 to cancel the deviation. In this manner, by using both the feedforward control and the feedback control, it is possible to make the actual rotational speed of the input member 31 to follow the target rotational speed Net with high responsiveness.

Since the rotation maintained engagement control is performed, the synchronous rotational speed increases with a relatively large inclination as the vehicle speed increases, whereas the actual rotational speed of the input member 31 and the internal combustion engine EG remains substantially constant or slightly decreases, in the first forward drive mode, in the period from time T03 to time T04. In the period from time T04 to time T05, the synchronous rotational speed decreases while clutch-to-clutch shifting between the first clutch C1 and the second clutch C2 is performed in association with switching from the first forward drive mode to the second forward drive mode. Meanwhile, the actual rotational speed of the input member 31 and the internal combustion engine EG still remains substantially constant or slightly decreases. In the period from time T05 to time T06, the synchronous rotational speed increases with an inclination smaller than that of the first forward drive mode, while the speed ratio of the continuously variable speed change mechanism 35A is fixed to the maximum speed ratio, in the second forward drive mode. Meanwhile, the actual rotational speed of the input member 31 and the internal combustion engine EG still remains substantially constant or slightly decreases. Note that in FIG. 4, "2nd" in the second forward drive mode indicates a state in which the speed ratio of the continuously variable speed change mechanism 35A is fixed to the maximum speed ratio, and "CVT" in the second forward drive mode indicates a state in which the speed ratio of the continuously variable speed change mechanism 35A changes continuously, thereby distinguishing the two states from each other.

After that, the rotation maintained engagement control is performed at least until continuously variable shifting is performed in the second forward drive mode (step #05; Yes). In the present embodiment, the rotation maintained engagement control is performed until the rotational speed difference between the rotational speed of the shift input member 34 and the rotational speed of the input member 31 becomes less than or equal to a set rotational speed difference that is determined in advance. The set rotational speed difference is set to a value in a range of rotational speed difference (for example, from 20 to 100 [rpm]) with which the shift input member 34 and the input member 31 can be regarded as rotating synchronously.

When the shift input member 34 and the input member 31 rotate synchronously (time T07), the lock-up clutch 33 is placed in the direct-coupling engaged state (step #06). Thus, the rotation maintained engagement control ends.

As described above, the control device 1 of the present disclosure performs rotation maintained engagement control during the period from when an engagement pressure is started to be generated in the lock-up clutch 33 to when the shift input member 34 and the input member 31 are synchronized. Since the rotation maintained engagement control is performed, it is possible to reduce the variation width of the rotational speed of the input member 31 and the internal combustion engine EG, regardless of a change in rotational speed of the shift input member 34, even though the speed ratio of the speed change mechanism 35 changes in a stepwise manner when the drive mode is switched from the first forward drive mode to the second forward drive mode.

Further, in the present embodiment, the target rotational speed Net of the input member 31 and the internal combustion engine EG in rotation maintained engagement control is set based on the synchronization prediction line in the second forward drive mode in the future. Therefore, it is possible to reduce the variation width of the rotational speed of the input member 31 and the internal combustion engine EG, even before and after the speed ratio of the continuously variable speed change mechanism 35A starts to decrease from the maximum speed ratio and the lock-up clutch 33 is placed in the direct-coupling engagement state in the second forward drive mode. Accordingly, for example, it is possible to reduce the variation width of the rotational speed of the input member 31 and the internal combustion engine EG, throughout the entire period from when the first forward drive mode is switched to the second forward drive mode upon starting the vehicle, for example, to when the speed ratio of the continuously variable speed change mechanism 35A starts to change from the maximum speed ratio in the second forward drive mode.

Especially, as in the present embodiment, even in the case where the speed change mechanism 35 includes the continuously variable speed change mechanism 35A and the forward/reverse drive switching mechanism 35B arranged in parallel, and stepped shifting is performed by cooperation of these mechanisms, the occupant of the vehicle is less likely to have a feeling of shifting resulting from stepped shifting. Accordingly, even in the case where continuously variable shifting is actually performed after stepped shifting is performed, the occupant of the vehicle hardly has a feeling of shifting, and the drivability upon starting the vehicle can be improved.

OTHER EMBODIMENTS (1) In the above embodiment, an exemplary configuration has been illustrated in which rotation maintained engagement control is performed during the period from when an engagement pressure is started to be generated in the lock-up clutch 33 to when the shift input member 34 and the input member 31 are synchronized. However, the present disclosure is not limited to this configuration. For example, rotation maintained engagement control may wait to be performed until stepped shifting is started, and may be performed only during the period from when stepped shifting is started to when the shift input member 34 and the input member 31 are synchronized. Alternatively, for example, rotation maintained engagement control may be ended when continuously variable shifting is performed in the second forward drive mode, and may be performed only during the period from when an engagement pressure is started to be generated in the lock-up clutch 33 to when continuously variable shifting is started.

(2) In the above embodiment, an exemplary configuration has been illustrated in which the continuously variable speed change mechanism 35A and the forward/reverse drive switching mechanism 35B are arranged in parallel, and the speed ratio of the speed change mechanism 35 changes in a stepwise manner when the drive mode is switched from the first forward drive mode to the second forward drive mode. However, the present disclosure is not limited to this configuration. For example, the forward/reverse drive switching mechanism 35B may be capable of switching between a plurality of shift speeds (a plurality of fixed speed ratios) during forward drive, and may be capable of performing stepped shifting alone. In this case, the continuously variable speed change mechanism 35A and the forward/reverse drive switching mechanism 35B may be arranged in series. Even with these configurations, as the control device 1 performs rotation maintained engagement control, the drivability during stepped shifting can be improved.

(3) The features disclosed in each of the above embodiments (including the embodiment and the other embodiments described above; the same applies hereafter) may be applied in combination with the features disclosed in the other embodiments as long as no inconsistency arises. Regarding other features as well, the embodiments disclosed in the specification are merely examples in all respects, and it should be understood that modifications may be made within the scope of the disclosure.

SUMMARY OF EMBODIMENTS

To summarize the above, a control device according e present disclosure is preferably configured as described below.

A control device (1) controls a vehicle transmission device (3) including an input member (31) drivingly coupled to an internal combustion engine (EG), an output member (36) drivingly coupled to wheels (W), a shift input member (34) drivingly coupled to the input member (31) via a fluid coupling (32) having a lock-up clutch (33), and a speed change mechanism (35) disposed on a power transmission path connecting the shift input member (34) and the output member (36). The speed change mechanism (35) is capable of performing both continuously variable shifting that continuously changes a speed ratio, and stepped shifting that changes a speed ratio in a stepwise manner.

When the stepped shifting is performed, rotation maintained engagement control is performed that controls an engagement pressure of the lock-up clutch (33) such that a rotational speed of the input member (31) follows a predetermined target rotational speed (Net), regardless of a change in rotational speed of the shift input member (34).

According to the configuration of the speed change mechanism (35) of the vehicle transmission device (3) capable of performing both continuously variable shifting and stepped shifting, the rotational speed of the shift input member (34) changes in a stepwise manner in response to a stepwise change in speed ratio, during stepped shifting In this case, if the rotational speed of the input member (31) and the internal combustion engine (EG) changes greatly in response to the stepwise change in rotational speed of the shift input member (34), this may result in giving a sense of discomfort to the occupant of the vehicle. In particular, in the vehicle transmission device (3) including the continuously variable speed change mechanism (35A), variation in the rotational speed of the input member (31) and the internal combustion engine (EG) is generally small. Therefore, if such a phenomenon occurs during stepped shifting, the occupant of the vehicle is likely to have a sense of discomfort due to the difference from the case of continuously variable shifting.

In this regard, according to the above configuration, by performing rotation maintained engagement control that controls the engagement pressure of the lock-up clutch (33) when the stepped shifting is performed, it is possible to make the rotational speed of the input member (31) follow the predetermined target rotational speed (Net), regardless of a change in rotational speed of the shift input member (34). Even when the rotational speed of the shift input member (34) changes greatly in response to a stepwise change in speed ratio, it is possible to reduce the variation width of the rotational speed of the input member (31) and the internal combustion engine (EG), by making the rotational speed of the input member (31) and the internal combustion engine (EG) follow the predetermined target rotational speed (Net) that has small temporal changes, for example. Therefore, the drivability during stepped shifting can be improved. Further, the rotational speed of the input member (31) and the internal combustion engine (EG) can be prevented from excessively increasing, so that the fuel consumption rate can be improved.

According to another aspect, it is preferable that:
in the rotation maintained engagement control, a target engagement pressure of the lock-up clutch (33) be calculated based on a target rotational speed (Net) of the internal combustion engine (EG) and the rotational speed of the shift input member (34), and the engagement pressure of the lock-up clutch (33) be controlled to follow the target engagement pressure.

According to this configuration, it is possible to make the rotational speed of the input member (31) follow more accurately the target rotational speed (Net) of the internal combustion engine (EG), in accordance with the rotational speed of the shift input member (34) that changes with the drive state.

According to another aspect, it is preferable that:
the target rotational speed (Net) of the internal combustion engine (EG) be set based on a predicted rotational speed of the shift input member (34) in the continuously variable shifting that is to be performed after the stepped shifting.

According to this configuration, it is possible to reduce the variation width of the rotational speed of the input member (31) and the internal combustion engine (EG) when continuously variable shifting is started after stepped shifting. Therefore, the drivability upon starting continuously variable shifting can be improved.

According to another aspect, it is preferable that:
the rotation maintained engagement control be performed at least during a period from when the stepped shifting is started to when a rotational speed difference between the rotational speed of the shift input member (34) and the rotational speed of the input member (31) becomes less than or equal to a set rotational speed difference that is determined in advance.

According to this configuration, by performing rotation maintained engagement control at least after stepped shifting is started in which the speed ratio changes greatly, the drivability during stepped shifting can be made appropriate and improved.

According to another aspect, it is preferable that:
control for engaging the lock-up clutch (33) be started before the stepped shifting is performed; and
the rotation maintained engagement control be performed also during a period from when an engagement pressure is started to be generated in the lock-up clutch (33) to when the stepped shifting is started.

According to this configuration, by performing rotation maintained engagement control from the time point before stepped shifting is started, the drivability during the stepped shifting can be further improved.

According to another aspect, it is preferable that:
the speed change mechanism (35) include a continuously variable speed change mechanism (35A) and a fixed-ratio speed change mechanism (35B) that are arranged in parallel to each other on the power transmission path;
a speed ratio of the fixed-ratio speed change mechanism (35B) be set to a value greater than a maximum speed ratio of the continuously variable speed change mechanism (35A); and
the speed change mechanism (35) perform the stepped shifting, by switching from a first drive mode in which rotation of the shift input member (34) is transmitted to the output member (36) via the fixed-ratio speed change mechanism (35B) to a second drive mode in which rotation of the shift input member (34) is transmitted to the output member (36) via the continuously variable speed change mechanism (35A).

According to this configuration, the speed change mechanism (35) includes the continuously variable speed change mechanism (35A) and the fixed-ratio speed change mechanism (35B) that are arranged in parallel to each other, and stepped shifting is performed by cooperation of these mechanisms. In this configuration, the drivability during stepped shifting can be improved.

According to another aspect, it is preferable that:
the target rotational speed (Net) be a constant rotational speed.

According to this configuration, even during stepped shifting, the rotational speed of the input member (31) and the internal combustion engine (EG) can be maintained constant. Therefore, the drivability during stepped shifting can be further improved.

The control device according to the present disclosure only needs to provide at least one of the above advantageous effects.

The invention claimed is:

1. A control device that controls a vehicle transmission device including an input drivingly coupled to an internal combustion engine, an output drivingly coupled to wheels, a shift input drivingly coupled to the input via a fluid coupling having a lock-up clutch, and a speed change mechanism disposed on a power transmission path connecting the shift input and the output, wherein the speed change mechanism is capable of performing both continuously variable shifting that continuously changes a speed ratio, and stepped shifting that changes a speed ratio in a stepwise manner, the control device comprising:
an electronic control unit that is configured to perform, when the stepped shifting is performed, rotation maintained engagement control that controls an engagement pressure of the lock-up clutch such that a rotational speed of the input follows a predetermined target rotational speed, regardless of a change in rotational speed of the shift input,
wherein the target rotational speed of the internal combustion engine is set based on a predicted rotational speed of the shift input in the continuously variable shifting that is to be performed after the stepped shifting.

2. The control device according to claim 1, wherein in the rotation maintained engagement control, a target engagement pressure of the lock-up clutch is calculated based on a target rotational speed of the internal combustion engine and the rotational speed of the shift input, and the engagement pressure of the lock-up clutch is controlled to follow the target engagement pressure.

3. The control device according to claim 2, wherein:
control for engaging the lock-up clutch is started before the stepped shifting is performed; and the rotation maintained engagement control is performed also during a period from when an engagement pressure is started to be generated in the lock-up clutch to when the stepped shifting is started.

4. The control device according to claim 3, wherein:
the speed change mechanism includes a continuously variable speed change mechanism and a fixed-ratio speed change mechanism that are arranged in parallel to each other on the power transmission path;
a speed ratio of the fixed-ratio speed change mechanism is set to a value greater than a maximum speed ratio of the continuously variable speed change mechanism; and
the speed change mechanism performs the stepped shifting, by switching from a first drive mode in which rotation of the shift input is transmitted to the output via the fixed-ratio speed change mechanism to a second drive mode in which rotation of the shift input is transmitted to the output via the continuously variable speed change mechanism.

5. The control device according to claim 4, wherein the target rotational speed is a constant rotational speed.

6. The control device according to claim 1, wherein:
control for engaging the lock-up clutch is started before the stepped shifting is performed; and
the rotation maintained engagement control is performed also during a period from when an engagement pressure is started to be generated in the lock-up clutch to when the stepped shifting is started.

7. The control device according to claim 6, wherein:
the speed change mechanism includes a continuously variable speed change mechanism and a fixed-ratio speed change mechanism that are arranged in parallel to each other on the power transmission path;
a speed ratio of the fixed-ratio speed change mechanism is set to a value greater than a maximum speed ratio of the continuously variable speed change mechanism; and
the speed change mechanism performs the stepped shifting, by switching from a first drive mode in which rotation of the shift input is transmitted to the output via the fixed-ratio speed change mechanism to a second drive mode in which rotation of the shift input is transmitted to the output via the continuously variable speed change mechanism.

8. The control device according to claim 7, wherein the target rotational speed is a constant rotational speed.

9. The control device according to claim 1, wherein the rotation maintained engagement control is performed at least during a period from when the stepped shifting is started to when a rotational speed difference between the rotational speed of the shift input and the rotational speed of the input becomes less than or equal to a set rotational speed difference that is determined in advance.

10. The control device according to claim 9, wherein:
control for engaging the lock-up clutch is started before the stepped shifting is performed; and
the rotation maintained engagement control is performed also during a period from when an engagement pressure is started to be generated in the lock-up clutch to when the stepped shifting is started.

11. The control device according to claim 10, wherein:
the speed change mechanism includes a continuously variable speed change mechanism and a fixed-ratio speed change mechanism that are arranged in parallel to each other on the power transmission path;
a speed ratio of the fixed-ratio speed change mechanism is set to a value greater than a maximum speed ratio of the continuously variable speed change mechanism; and
the speed change mechanism performs the stepped shifting, by switching from a first drive mode in which rotation of the shift input is transmitted to the output via the fixed-ratio speed change mechanism to a second drive mode in which rotation of the shift input is transmitted to the output via the continuously variable speed change mechanism.

12. The control device according to claim 11, wherein the target rotational speed is a constant rotational speed.

13. The control device according to claim 2, wherein the rotation maintained engagement control is performed at least during a period from when the stepped shifting is started to when a rotational speed difference between the rotational speed of the shift input and the rotational speed of the input becomes less than or equal to a set rotational speed difference that is determined in advance.

14. The control device according to claim 13, wherein:
control for engaging the lock-up clutch is started before the stepped shifting is performed; and
the rotation maintained engagement control is performed also during a period from when an engagement pressure is started to be generated in the lock-up clutch to when the stepped shifting is started.

15. The control device according to claim 14, wherein:
the speed change mechanism includes a continuously variable speed change mechanism and a fixed-ratio speed change mechanism that are arranged in parallel to each other on the power transmission path;
a speed ratio of the fixed-ratio speed change mechanism is set to a value greater than a maximum speed ratio of the continuously variable speed change mechanism; and
the speed change mechanism performs the stepped shifting, by switching from a first drive mode in which rotation of the shift input is transmitted to the output via the fixed-ratio speed change mechanism to a second drive mode in which rotation of the shift input is transmitted to the output via the continuously variable speed change mechanism.

16. The control device according to claim 15, wherein the target rotational speed is a constant rotational speed.

17. A control device that controls a vehicle transmission device including an input drivingly coupled to an internal combustion engine, an output drivingly coupled to wheels, a shift input drivingly coupled to the input via a fluid coupling having a lock-up clutch, and a speed change mechanism disposed on a power transmission path connecting the shift input and the output, wherein the speed change mechanism is capable of performing both continuously variable shifting that continuously changes a speed ratio, and stepped shifting that changes a speed ratio in a stepwise manner, the control device comprising:
an electronic control unit that is configured to perform, when the stepped shifting is performed, rotation maintained engagement control that controls an engagement pressure of the lock-up clutch such that a rotational speed of the input follows a predetermined target rotational speed, regardless of a change in rotational speed of the shift input,
wherein the rotation maintained engagement control is performed at least during a period from when the stepped shifting is started to when a rotational speed difference between the rotational speed of the shift input and the rotational speed of the input becomes less than or equal to a set rotational speed difference that is determined in advance.

* * * * *